United States Patent
Karp et al.

(10) Patent No.: US 6,493,712 B1
(45) Date of Patent: Dec. 10, 2002

(54) SELF-DESCRIBING ATTRIBUTE VOCABULARIES IN A SOFTWARE SYSTEM

(75) Inventors: Alan H. Karp, Palo Alto, CA (US); Rajiv Gupta, Los Altos, CA (US); Arindam Banerji, Sunnyvale, CA (US); Chia-Chiang Chao, Saratoga, CA (US); Ernest Mak, Fremont, CA (US); Sandeep Kumar, Santa Clara, CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/376,149

(22) Filed: Aug. 17, 1999

(51) Int. Cl.$^7$ ................................................. G06F 17/30
(52) U.S. Cl. ....................... 707/6; 707/102; 709/217; 358/1.11; 358/1.13; 358/1.18
(58) Field of Search ............... 707/1–6, 10, 101–104.1; 709/217, 202, 219, 226, 203, 220; 705/52, 57, 54; 358/1.11, 1.13, 1.18

(56) References Cited

U.S. PATENT DOCUMENTS

| | | | | |
|---|---|---|---|---|
| 5,347,632 A | * | 9/1994 | Filepp et al. | 707/202 |
| 5,970,490 A | * | 10/1999 | Morgenstern | 707/10 |
| 6,151,624 A | * | 11/2000 | Teare et al. | 709/217 |
| 6,195,661 B1 | * | 2/2001 | Filepp et al. | 707/102 |

* cited by examiner

*Primary Examiner*—John Breene
*Assistant Examiner*—Mohammad Ali (57) ABSTRACT

A software system with self-describing attribute vocabularies that enhance the capability of service providers to advertise their resources and that facilitate the addition of new types of attributes and resources to the system. Each self-describing attribute vocabulary is characterized by a corresponding set of attribute properties and a corresponding set of:matching rules that are adapted to the corresponding attribute properties. The software system includes a matching engine that enables a service provider of a resource to describe the resource to the software system in terms of any one or more of the self-describing attribute vocabularies.

20 Claims, 4 Drawing Sheets

FIG. 1

| Repository Handler | Service Provider | Attribute Vocabulary | Attribute_1 | Attribute_2 | ~ | Attribute_n |
|---|---|---|---|---|---|---|
| 1 | – | – | – | – | ~ | – |
| 2 | REF_44 | 1 | Vocabulary Name = Printer Vocabulary | Vocabulary Version = 1.0 | ~ | – |
| 3 | REF_45 | 1 | Vocabulary Name = Printer Vocabulary | Vocabulary Version = 1.1 | ~ | – |
| 4 | REF_40 | 2 | Printer Manufacturer = Company A | – | ~ | – |
| 5 | REF_42 | 3 | Manufacturer = Company B | Print Cost = .05 | ~ | Fonts = Standard |
| 6 | REF_40 | 3 | Manufacturer = Company A | Print Cost = .30 | ~ | Fonts = Courier, Ariel, Helvetica |
| 7 | REF_46 | 8 | Manufacturer = Company A | Print Cost = .25 | ~ | Fonts = Courier, Ariel, Helvetica, Times |
| 8 | – | – | – | Manufacturer = Company B | ~ | – |

SELF-DESCRIBING ATTRIBUTE VOCABULARIES IN A SOFTWARE SYSTEM

BACKGROUND OF THE INVENTION

1. Field of Invention

The present invention pertains to the field of software systems. More particularly, this invention relates to self-describing attribute vocabularies in a software system.

2. Art Background

Computer systems and networks of computer systems and similar devices may be viewed as a collection of resources. These resources may include software resources such as files, data bases, application programs, and information services. These resources may also include hardware resources such as storage devices, printers, communication devices, and display devices to name only a few examples. These resources may be local resources of a computer system or similar device or may be remote resources accessible via a network connection to one or more other computer systems or similar devices.

Software systems for computer systems and similar devices commonly include service providers which are adapted to particular types of resources. One example of a service provider is a file server. Other examples of service providers include printer servers, digital document servers, as well as providers of information services such as news, stock quotes, etc. A software program that accesses a resource of a service provider may be referred to as a client of the service provider.

Software systems for computer systems and similar devices commonly implement protocols that enable potential clients to discover resources and that enable service providers to advertise their resources to potential clients. In such a system, a service provider usually formulates attributes that describe its capabilities and a potential client usually formulates attributes that describe requirements about a desired resource. Such a system typically enables the potential client to discover a desired resource by determining whether a match occurs between the attributes that describe the desired resource and the attributes that describe the capabilities of the service providers.

Unfortunately, prior protocols for resource discovery typically limit the ability of service providers to advertise their resources. For example, a printer service provider may not be able to advertise incentives associated with its printer resources in a system in which attributes are limited to hardware related factors such as resolution, fonts, and colors, etc. In addition, such prior systems may make it difficult to add new types of resources to a software system. For example, attributes which are adapted to files or hardware devices may not be suitable for new types of resources such as news or stock quotes or other information services.

SUMMARY OF THE INVENTION

A software system is disclosed with self-describing attribute vocabularies that enhance the capability of service providers to advertise their resources and that facilitate the addition of new types of resources and attributes to the system. The self-describing attribute vocabularies are active entities that are made available as resources in the software system. The software system enables vocabulary service providers to easily make new attribute vocabularies available to tasks executing in the software system and enables tasks to discover resources in terms of one or more of the self-describing attribute vocabularies.

Each self-describing attribute vocabulary is characterized by a corresponding set of attribute properties and a corresponding set of matching rules that are adapted to the corresponding attribute properties. The software system includes a matching engine that enables a service provider of a resource to describe the resource to the software system in terms of any one or more of the self-describing attribute vocabularies. The attribute vocabularies are self-describing in that the attribute properties and associated matching rules can vary widely among the attribute vocabularies. The matching engine implements mechanisms that enable software tasks to discover and use any one or more of the self-describing attribute vocabularies and the matching engine adapts its attribute-based lookup operations for resources to the appropriate set of matching rules.

Other features and advantages of the present invention will be apparent from the detailed description that follows.

BRIEF DESCRIPTION OF THE DRAWINGS

The present invention is described with respect to particular exemplary embodiments thereof and reference is accordingly made to the drawings in which.

DETAILED DESCRIPTION

Figure 1:
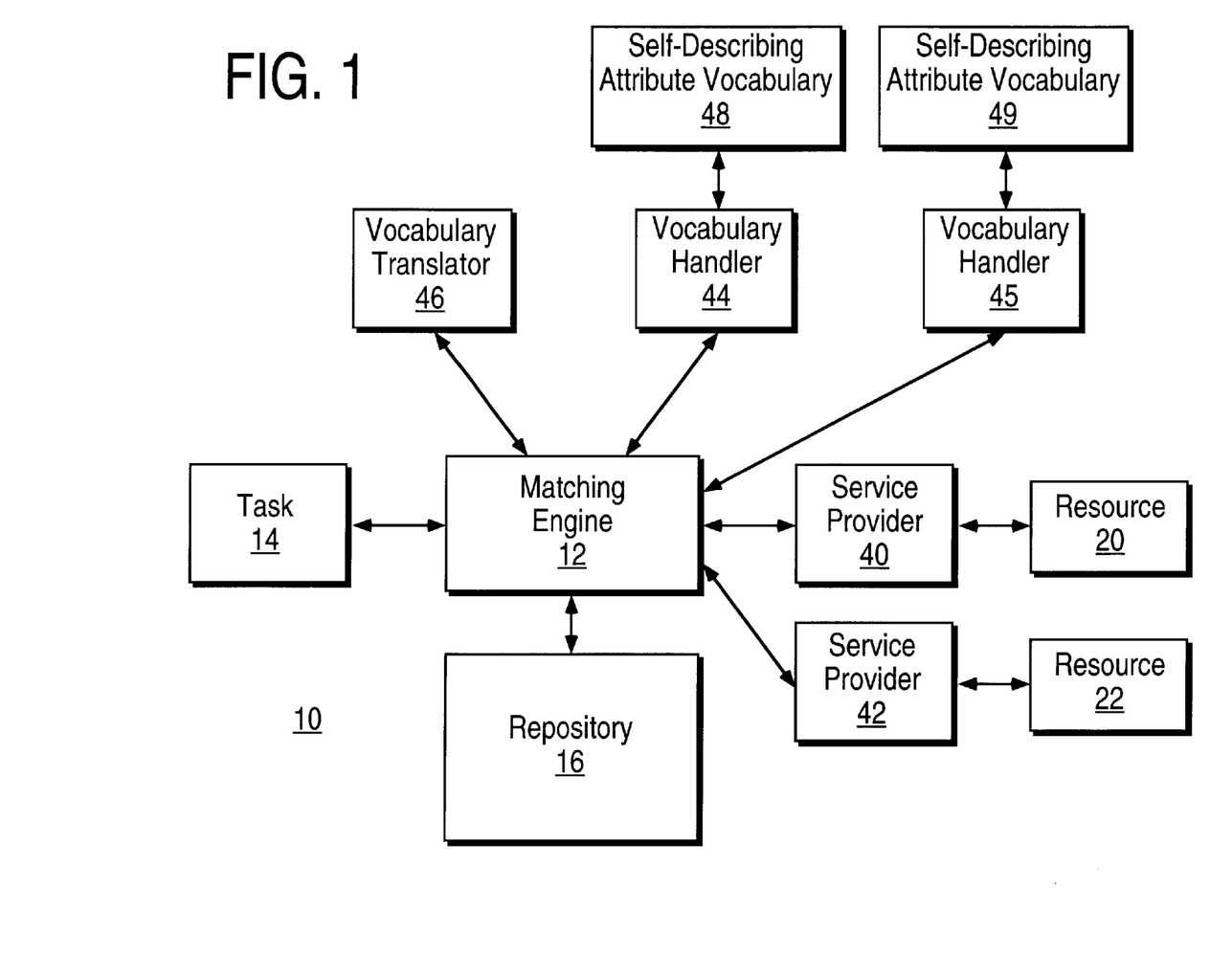
FIG. 1 illustrates a software system having a set of self-describing attribute vocabularies according to the present teachings.

FIG. 1 illustrates a software system 10 having a set of self-describing attribute vocabularies 48–49 according to the present teachings. The software system 10 enables service providers to describe their resources to potential clients in the software system 10 using one or more of the self-describing attribute vocabularies 48–49. The software system 10 may support any number of service providers and resources including local and remote service providers and resources.

The software system 10 includes a matching engine 12 and a repository 16. The matching engine 12 enables service providers to discover one or more of the self-describing attribute vocabularies 48–49. The service providers generate attributes that describe their resources in terms of the discovered ones of the self-describing attribute vocabularies 48–49 and then use the matching engine 12 to register the attributes that describe their resources into the repository 16. The matching engine 12 enables potential clients to discover desired resources by adapting attribute-based lookups to the repository 16 to the appropriate ones of the self-describing attribute vocabularies 48–49.

For example, a service provider 40 is shown which registers a resources 20 into the repository 16. Also shown is a service provider 42 which registers a resources 22 into the repository 16. The resources 20 and 22 represents any local or remote resource which may be associated with the software system 10. The resource 20 or 22 may be a software resource such as a file, a digital document, a database, a process, or an application program to name a few examples. The resource 20 or 22 may be hardware resource such as a memory segment, a storage device, a printer or other output device, a communication device, an input device, or a display device to name only a few examples.

The self-describing attribute vocabularies 48–49 are themselves resources which are registered into the repository 16 by their service providers a pair of vocabulary handlers 44–45, respectively. Also shown is a vocabulary translator 46 which is a service provider that uses the matching engine 12 to register a vocabulary translator resource into the repository 16.

In one embodiment, the self-describing attribute vocabularies 48–49 are each characterized by a set of attribute properties and a set of corresponding matching rules for the attribute properties. An attribute property may specify a label for an attribute, whether or not the attribute is required, whether it is single valued or multi-valued and type of value, and any limits on the allowed values. For example, an attribute vocabulary in which attribute properties include name-value pairs may specify a set of labels and valid types or values for each label. An example of a label is NAME and an example of a value is a string of arbitrary length that begins with a slash (/) character.

The self-describing attribute vocabularies 48–49 are self-describing in that there are no fixed rules imposed on what is a valid attribute property. Moreover, there are no fixed rules in the software system 10 on what constitutes a match between attributes. Instead, matching rules are defined by each of the self-describing attribute vocabularies 48–49 and the matching engine 12 adapts its matching operations accordingly during attribute based lookups to the repository 16. For example, the attribute vocabulary 48 may implement a matching rule that any string value is considered to be exactly the same as another string value if they match character for character except for case. On the other hand, the attribute vocabulary 49 may implement a matching rule that any string value is considered to be exactly the same as another string value if they match character for character including case. The matching engine 12 adapts to these rules depending upon whether it is comparing attributes formulated in the vocabulary 48 or 49.

A new self-describing attribute vocabulary having new attribute properties and/or new matching rules may be easily integrated into the software system 10 by providing a vocabulary handler which registers a new attribute vocabulary resource into the repository 16. Thereafter, service providers and potential clients may freely discover and use the new self-describing attribute vocabulary.

The vocabulary translator 46 translates between different attribute vocabularies to extend the coverage of resource discovery in the software system 10. For example, the vocabulary translator 46 may translate between attribute vocabularies which are implemented in different speaking languages or which use different labels for attribute properties or which use different matching rules.

The matching engine 12 enables potential clients to discover and access the resources registered in the repository 16. For example, a task 14, the service providers 40–42, and the vocabulary translator 46 are all potential clients that may discover and use the self-describing attribute vocabularies 48–49 once they are registered in the repository 16 by the corresponding vocabulary handlers 44–45. In another example, the task 14 is a potential client that may discover and use the resources 20–22 once they are registered in the repository 16 by the corresponding service providers 40–42.

The task 14 represents any software element that makes use of resources in the software system 10. The task 14 is a potential client to any of the resources registered in the repository 16. For example, the task 14 may be an application program executing in the software system 10. The task 14 may also be a process executing in the software system 10 such as a user interface process that enables a user to launch and interact with various resources in the software system 10.

The service providers 40–42 and the vocabulary handlers 44–45 manage the resources that they register with the repository 16 and include driver routines adapted to the particulars of their resources. For example, if the resource 20 is a file, the service provider 40 that registers the file 20 includes driver routines for reading and writing file data to and from the physical medium that holds the file. The service providers 40–42 and the vocabulary handlers 44–45 as well as the vocabulary translator 46 may execute on the same computer system as the matching engine 12 or on a different computer system with appropriate interconnect to the matching engine 12.

Figure 2:
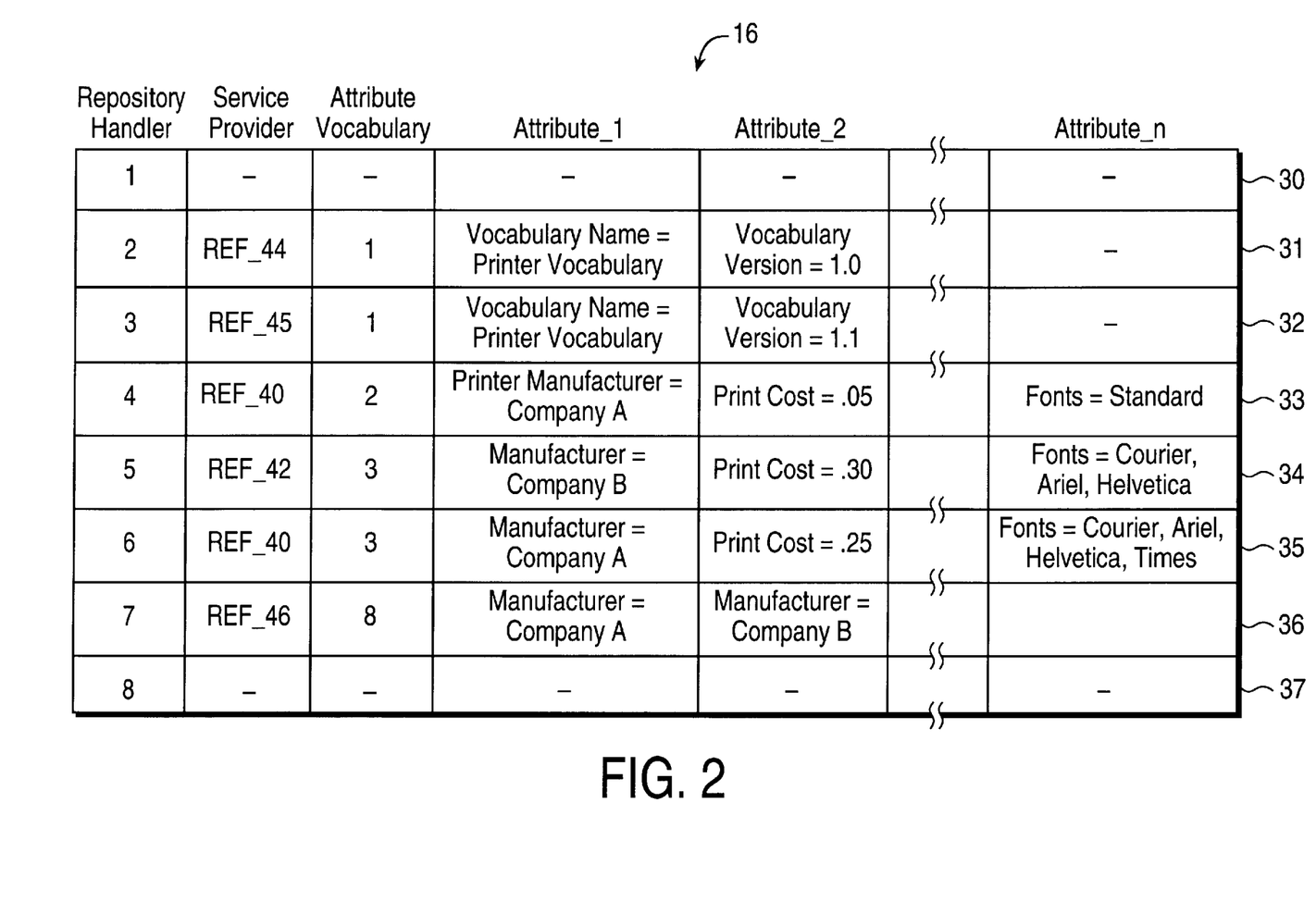
FIG. 2 shows a set of resource descriptors registered in a repository.

FIG. 2 shows a set of resource descriptors 30–37 registered in the repository 16. Each resource descriptor 30–37 includes a field for holding a repository handle, a field for holding a reference to a service provider, a field for holding a reference to an attribute vocabulary, and a set of n fields for holding attributes. Each resource descriptor 30–37 corresponds to a resource accessible to potential clients via the matching engine 12.

The repository handles are used by the matching engine 12 to reference the resource descriptors 30–37. For example, the resource descriptor 30 is referenced with a repository handle equal to 1 and the resource descriptor 31 is referenced with a repository handle equal to 2, etc. The references to the service providers are used by the matching engine 12 to identify the service providers that function as resource handlers for the corresponding resources. The attributes 1-n are attributes that are registered for the corresponding resources. The references to the attribute vocabularies are used by the matching engine 12 to identify the self-describing attribute vocabularies 48–49 that are to be used to interpret the attributes_1-n of the corresponding resource descriptor.

The resource descriptor 30 corresponds to a base vocabulary which is used to end recursions in the attribute vocabulary fields of the attribute vocabulary resources which are registered in the repository 16. The attribute properties of the base vocabulary in one embodiment includes the labels VOCABULARY NAME and VOCABULARY VERSION and associated string type indicators. In other embodiments, the base vocabulary may have other arrangements of attribute properties. The resource handler for the base vocabulary may be the matching engine 12 which provides the attribute properties to potential clients on request.

The following description focuses on an example in which the resources 20–22 are printers, the service providers 40–42 are respective resource handlers for the printers 20–22, the self-describing attribute vocabularies 48–49 are printer vocabularies, and the vocabulary translator 46 is a vocabulary translator between the printer vocabularies 48–49. The following description is nevertheless applicable to any other type of resource and corresponding attribute vocabularies and translators.

In one embodiment, a messaging structure with payloads is used for communication among the tasks, the matching engine, service providers, vocabulary handlers, and other entities in the software system 10. The message structure, for example, is used to register resources including attribute vocabularies and to provide attributes for matching and/or translation, etc. In other embodiments, commands rather than messages may be used in which arguments of the commands provide the attributes and other relevant information.

Figure 3A:
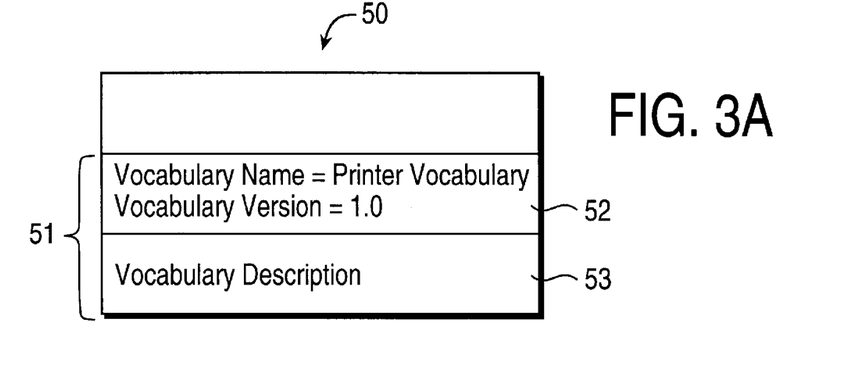
FIGS. 3a–3b show messages which the vocabulary handlers provide to the matching engine to register the self-describing attribute vocabularies into the repository.

The resource descriptor 31 corresponds to the self-describing attribute vocabulary 48. FIG. 3a shows a message 50 which the vocabulary handler 44 provides to the matching engine 12 to register the attribute vocabulary 48 into the repository 16 in one embodiment. The message 50 includes a payload 51 that carries a set of attributes 52 which include VOCABULARY NAME=printer vocabulary and VOCABULARY VERSION=1.0 along with a vocabulary description 53 for the attribute vocabulary 48. In other embodiments, commands rather than messages may be used to register attribute vocabularies and the arguments of the commands provide the attributes.

In response to the message 50, the matching engine 12 creates the resource descriptor 31, generates the repository handle equal to 2 and writes it into the repository handle field of the resource descriptor 31, writes a reference ($REF_{13}$ 44) which the matching engine 12 uses to refer to the vocabulary handler 44 into the service provider field of the resource descriptor 31, writes the repository handle of the base vocabulary into the attribute vocabulary field of the resource descriptor 31, and writes the attributes 52 into the attribute__1-n fields of the resource descriptor 31.

The matching engine 12 internally stores the vocabulary description 53 and associates it with the repository handle of the resource descriptor 31. The vocabulary description 53 includes a set of attribute properties with corresponding type indicators. The vocabulary description further includes a set of matching rules. In this example, the attribute properties of the vocabulary description 53 include a list of label/type pairs including PRINTER MANUFACT/string, PRINT COST/floating-point in units of dollars per page, and FONTS/string that names a predefined font package such as "standard" or "enhanced." The matching rules of the vocabulary description 53 specify that a character string matches only if all characters in the string match including case.

This is only one example of a vocabulary description and numerous others are possible. For example, type indicators may include integer indicators. Matching rules may specify the meaning of arithmetic operators (>,<,=, etc.).

Figure 3B:
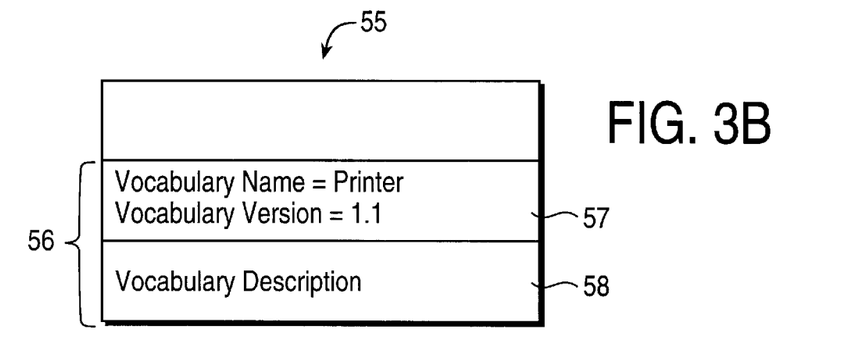

FIG. 3b shows a message 55 which the vocabulary handler 45 provides to the matching engine 12 to register the attribute vocabulary 49. The message 55 includes a payload 56 that carries a set of attributes 57 which include VOCABULARY NAME=printer vocabulary and VOCABULARY VERSION=1.1 along with a vocabulary description 58 for the attribute vocabulary 49. In response to the message 55, the matching engine 12 creates the resource descriptor 32, generates the repository handle equal to 3 and writes it into the repository handle field of the resource descriptor 32, writes a reference (REF__45) which the matching engine 12 uses to refer to the vocabulary handler 45 into the service provider field of the resource descriptor 32, writes the repository handle of the base vocabulary into the attribute vocabulary field of the resource descriptor 32, and writes the attributes 57 into the attribute__1-n fields of the resource descriptor 32. The matching engine 12 internally stores the vocabulary description 58 and associates it with the repository handle of the resource descriptor 32. The attribute properties of the vocabulary description 58 include a list of label/type pairs, MANUFACTURER/string, PRINT COST/floating-point in units of dollars per minute, and FONTS/string that lists a set of standard font styles. The matching rules of the vocabulary description 58 specify that a character string matches if more than half of its characters match without regard to case.

Once the attribute vocabularies 48–49 are registered in the repository 16 then any software task supported by the matching engine 12 including the service providers 40–42 may discover and use them. In one embodiment, a task discovers a desired resource by providing a get resource command to the matching engine 12 which includes a set of attributes for the desired resource. As previously mentioned, the get resource command may be provided using the message structure or may be provided as a command with arguments. The following is an example get resource command (GRC1) which the service provider 40 uses to discover attribute vocabularies for printers that are registered in the repository 16.

get{VOCABULARY NAME="printer vocabulary"}, bind to /grammar

The parameter /grammar in the GRC1 is a local name which the service provider 40 will use to refer to the desired resource. In response, the matching engine 12 performs an attribute-based lookup to the repository 16 which identifies any registered resources having an attribute that matches the attribute VOCABULARY NAME="printer vocabulary" contained in the GRC1. The resources that match according to the matching rules of the base vocabulary are the resource descriptors 31 and 32. The matching engine 12 uses an arbitration policy to select the resource descriptor 31 and then binds the corresponding repository handle 2 to the local name /grammar used by the service provider 40.

Once the service provider 40 has obtained a binding to an attribute vocabulary, in this case the attribute vocabulary 48, it can advertise the printer resource 20 to potential clients using the obtained attribute vocabulary. The service provider 40 describes the printer resource 20 to potential clients by obtaining a list of attribute properties that will be used to describe the printer resource 20 in terms of the obtained attribute vocabulary, generating the appropriate attributes in that attribute vocabulary, and then registering the appropriate attributes into the repository 16.

Figure 4:
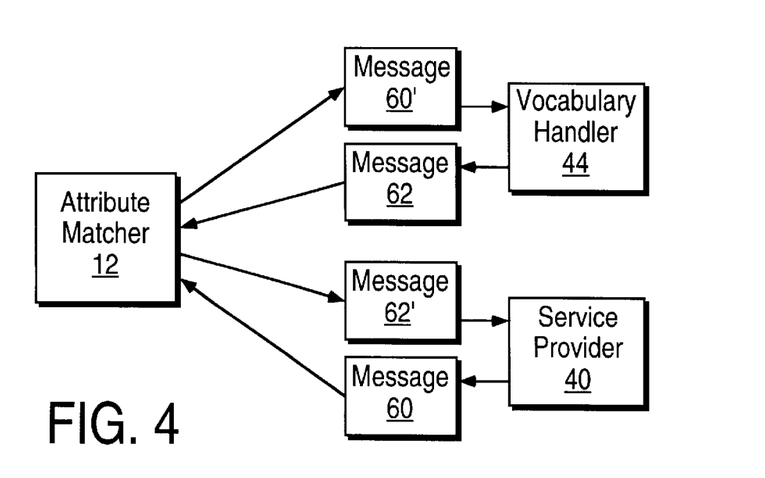
FIG. 4 shows a method which a service provider uses to obtain a list of attribute properties that will be used to describe its resource to potential clients.

FIG. 4 shows a method which the service provider 40 uses to obtain a list of attribute properties that will be used to describe the printer resource 20. The service provider 40 obtains the list of attribute properties from the vocabulary handler 44 by generating a message 60 to the matching engine 12. The message 60 names /grammar as the destination or "callee" for the message 60, and names a source or "caller" for which the service provider 40 is the service provider. The message 60 contains a payload which carries a resource-specific command that informs the recipient of the message 60 to return its attribute properties.

In response to the message 60, the matching engine 12 resolves the name /grammar to the attribute vocabulary 48, i.e. the repository handle 2, using the previously formed binding, obtains the service provider reference REF__44 from that resource descriptor 31, and forwards a message 60' to that service provider which is the vocabulary handler 44. The message 60' includes the payload and names the source from the message 60.

In response to the command in the payload of the message 60', the vocabulary handler 44 generates a message 62 that identifies the source provided in the message 60' as the destination for the message 62 and that contains the attribute properties and the matching rules of the attribute vocabulary 48 in its payload. The attribute properties carried in the payload of the message 62 include a list of label/type pairs including PRINTER MANUFACT/string, PRINT COST/ floating-point in units of dollars per page, and FONTS/string that names a predefined font package such as "standard" or "enhanced." The matching engine 12 forwards the message 62 to the service provider 40 as the message 62'.

In response to the returned attribute properties in the message 62', the service provider 40 generates a set of attributes that describe the printer resource 20 in terms of the returned attribute properties. The service provider 40 then registers the printer resource 20 by providing a message to the matching engine 12 that includes the attributes that describe the printer resource 20 and that includes the name /grammar that identifies the attribute vocabulary associated with the attributes. In this example, these attributes are PRINTER MANUFACT="company A" and PRINTER COST=0.05 and FONTS="standard". In response, the matching engine 12 creates the resource descriptor 33, generates the repository handle equal to 4 and writes it into the repository handle field of the resource descriptor 33, writes a reference (REF_40) which the matching engine 12 uses to refer to the service provider 40 into the service provider field of the resource descriptor 33, resolves the name /grammar to the attribute vocabulary 48 and writes the repository handle of the attribute vocabulary 48 into the attribute vocabulary field of the resource descriptor 33, and writes the attributes generated by the service provider 40 into the attribute_1-n fields of the resource descriptor 33.

The service provider 42 uses a similar process to describe the printer resource 22 to potential clients. The resulting registered attributes for the printer resource 22 in the resource descriptor 34 are "MANUFACTURER=company B" and "PRINTER COST=0.30" and "FONTS=courier, ariel, helvetica". The corresponding attribute properties are MANUFACTURER/string, PRINT COST/floating-point in units of dollars per minute, and FONTS/string that provides a list of standard font styles in accordance with the attribute vocabulary 49.

Once the resources 20–22 are registered in the repository 16 then any software task supported by the matching engine 12 as a potential client may discover and use them. For example, the task 14 may use the following get resource command (GRC2) to discover a desired printer resource and bind it to the local name /myprinter.

get{/myprintergrammar, PRINTER COST<0.10}, bind to /myprinter

The GRC2 includes an attribute PRINTER COST<0.10 which is to be used in an attribute-based lookup to the repository 16. In addition, the GRC2 includes a parameter /myprintergrammar which is a local name that the task 14 uses to refer to the attribute vocabulary 48 which is to be used in evaluating the attributes contained in the GRC2. The task 14 may have discovered the attribute vocabulary 48 and bound it to /myprintergrammar in a manner similar to that described above in connection with the GRC1. In response to the GRC2, the matching engine 12 resolves /myprintergrammar to a repository handle of 2 and uses the associated vocabulary description 53 to evaluate the attributes in the repository 16 in an attribute-based lookup. The matching engine 12 matches PRINTER COST<0.10 attribute from the GRC2 to attribute_2 of the resource descriptor 33 which is also in the vocabulary 48 using the matching rules in the vocabulary description 53 and binds the local name /myprinter to the resource descriptor 33. Thereafter, the task 14 may use this binding to send messages to the service provider 40 of the printer resource 20 which may include print jobs.

In another example, the task 14 may use the following get resource command (GRC3) to discover a desired printer resource and bind it to the local name /myprinter.

get{/myprintergrammar, PRINTER COST<0.10, FONTS="standard"}, bind to /myprinter

In response to the GRC3, the matching engine 12 matches PRINTER COST<0.10 and FONTS="standard" attributes from the GRC3 to attribute_2 and attribute_n, respectively, of the resource descriptor 33 using the matching rules of the vocabulary description 53 and binds the local name /myprinter to the resource descriptor 33. In one embodiment, all of the attributes listed in the GRC3 must match to a resource descriptor for a binding to be formed. An attribute of FONTS="STANDARD" would not match because the matching rules for the attribute vocabulary 48 require matching case for strings.

In another example, the task 14 may use the following get resource command (GRC4) to discover a desired printer resource and bind it to the local name /myprinter.

get{/otherprintergrammar, FONTS="helvetica"}, bind to /myprinter

The parameter /otherprintergrammar is a local name which the task 14 uses to refer to the attribute vocabulary 49. The matching engine 12 matches the FONTS="helvetica" attribute from the GRC4 to attribute_n of the resource descriptor 34 according to the matching rules of the attribute vocabulary 49 and binds the task 14 local name /myprinter to the resource descriptor 34.

The matching engine 12 may extend the coverage of the GRC4 by translating attributes_1-n of the resource descriptor 33, which is in the attribute vocabulary 48, to the attribute vocabulary 49 and then comparing the translated attributes to the attributes in the GRC4 which are also in the attribute vocabulary 49. The translation may be performed by the matching engine 12 or by the vocabulary translator 46. For example, the matching engine 12 may send a message to the vocabulary translator 46 that contains the attributes PRINTER MANUFACT="company A" and PRINTER COST=0.05 and FONTS="standard" from the resource descriptor 33 along with a command to translate to the attribute vocabulary 49. In response, the vocabulary translator 46 generates the translated attributes MANUFACTURER="company A" and PRINTER COST= 0.50 and FONTS="courier, helvetica, ariel" according to the attribute vocabulary 49. This assumes that the standard fonts package of the attribute vocabulary 48 includes courier, helvetica, and ariel. This further assumes that the printer 20 is a 10 page per minute printer so that the PRINTER COST of 0.05 dollar per page in terms of the attribute vocabulary 48 translates to 0.50 dollars per minute in terms of the attribute vocabulary 49. The FONTS="helvetica" attribute from the GRC4 now matches to the translated attribute_n of the resource descriptor 34 according to the matching rules for the attribute vocabulary 49.

The vocabulary translator 46 may register its translator resource into the repository 16 as the resource descriptor 36 including the attributes MANUFACTURER=company A and MANUFACTURER=company B to indicate that translation is available between attributes associated with printers provided by companies A and B. Thereafter, the translator resource is discoverable using an attribute-based lookup in a manner previously described. For example, the task 14 may discover the translator resource and send the vocabulary translator 46 attributes to be translated between the attribute vocabularies 48 and 49. Similarly, the vocabulary handlers 44 and 45 or the matching engine 12 itself may use the vocabulary translator 46 to translate attributes.

The infrastructure provided by the matching engine 12 and the repository 16 avoids imposing a single attribute vocabulary to which all potential clients and service providers in the software system 10 must comply. The software system 10 may in general have any number of self-describing attribute vocabularies and vocabulary translators which are competitive resources registered in the repository 16.

Figure 5:
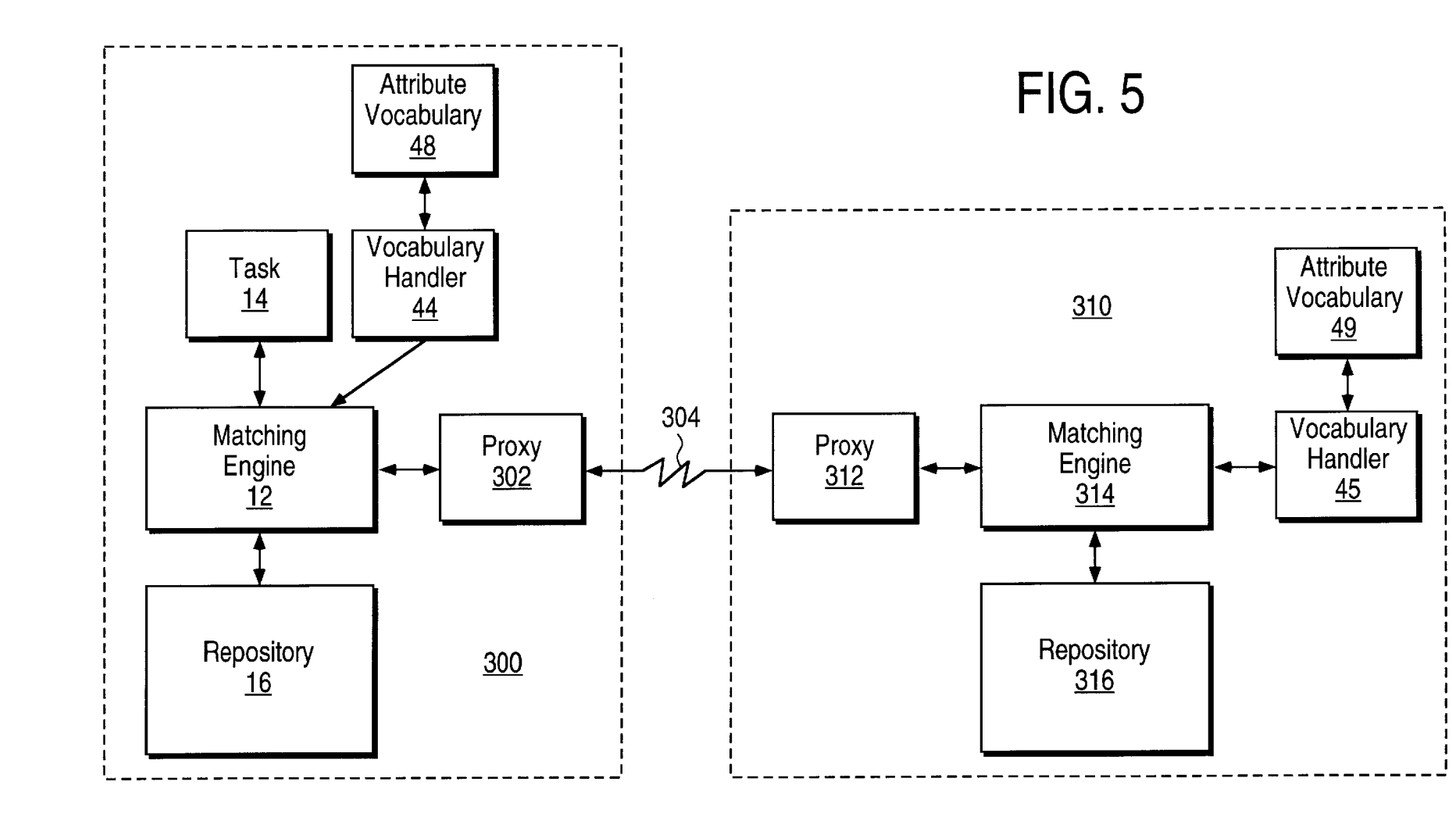
FIG. 5 shows an arrangement in which the self-describing attribute vocabularies reside on a pair of separate computer systems.

FIG. 5 shows an arrangement in which the attribute vocabularies 48 and 49 reside on a pair of separate computer systems 300 and 310. The computer systems 300 and 310 are interconnected via a communication link 304. The computer system 300 includes the matching engine 12 and the repository 16. The computer system 310 includes an matching engine 314 and a repository 316 that implements similar functionality to the matching engine 12 and the repository 16.

The computer system 310 includes the self-describing attribute vocabulary 49 which is a resource to be made available to tasks executing on the computer system 300. The vocabulary handler 45 on the computer system 310 registers the attribute vocabulary 49 in the repository 316 in a manner similar to that previously described. The computer system 310 executes a proxy 312 which discovers the attribute vocabulary 49 and obtains a binding to a local name for the attribute vocabulary 49 in a manner similar to that previously described.

The proxy 312 obtains the attributes_1-n from the resource descriptor for the attribute vocabulary 49 from the matching engine 314 and transfers them to a proxy 302 executing on the computer system 300 along with the local name that the proxy 312 uses to refer to the attribute vocabulary 49. The proxy 302 then registers the attribute vocabulary 49 to the repository 16 using the attributes_1-n obtained from the matching engine 314. The registration of the attribute vocabulary 49 to the matching engine 12 creates a resource descriptor in the repository 16 that names the proxy 302 as the service provider for the attribute vocabulary 49. The resource descriptor for the attribute vocabulary 49 in the repository 16 includes a resource-specific data field that contains the local name of the attribute vocabulary 49 used by the proxy 312.

Thereafter, the proxy 302 and the proxy 312 translate between local names used by tasks on the computer system 300 and local names used by the proxy 312. For example, a message generated by the task 14 that names the attribute vocabulary 49 as the destination is forwarded to the proxy 302 by the matching engine 12 because the proxy 302 is listed as the service provider in the resource descriptor for the attribute vocabulary 49 in the repository 16. The payload of this forwarded message contains the local name for the attribute vocabulary 49 used by the proxy 312 which is obtained from the resource-specific data field of the resource descriptor for the attribute vocabulary 49 in the repository 16. The proxy 302 transfers the forwarded message to the proxy 312 which then generates a message to the matching engine 314 that names as the destination the local name contained in the payload of the forwarded message from the proxy 302. A similar mechanism is used to transfer messages from the vocabulary handler 45 to the task 14.

A similar arrangement may be used for communication between tasks associated with matching engines that execute on the same computer system. For example, the matching engine 12 and the matching engine 314 may be implemented on the same computer system with the proxy 302 and the proxy 312 translating between local names associated with the matching engines 12 and 314.

The foregoing detailed description of the present invention is provided for the purposes of illustration and is not intended to be exhaustive or to limit the invention to the precise embodiment disclosed. Accordingly, the scope of the present invention is defined by the appended claims.

What is claimed is:

1. A software system, comprising:

repository for holding a set of attributes of each of a set of available resources in the software system;

matching engine that enables a set of vocabulary handlers to advertise a set of attribute vocabularies as included in the available resources by registering a set of attributes of each attribute vocabulary into the repository, wherein each attribute vocabulary is characterized by a corresponding set of attribute properties and a corresponding set of matching rules for use in an attribute-based lookup to the repository in response to a resource request from a potential client seeking to discover a new resource which is advertised in terms of the corresponding attribute vocabulary wherein the matching engine enables a service provider of the new resource to advertise the new resource by determining which of the attribute vocabularies registered in the repository match a set of desired attributes of a vocabulary, obtaining the attribute properties of the attribute vocabulary that matches the desired attributes, generating a set of attributes that describe the new resource in terms of the obtained attribute properties, and registering the attributes that describe the new resource into the repository.

2. The software system of claim 1, wherein each vocabulary handler registers the corresponding attribute vocabulary into the repository by performing the following steps:

providing the matching engine with the attributes that describe the corresponding attribute vocabulary;

providing the matching engine with the matching rules for the corresponding attribute vocabulary.

3. The software system of claim 1, wherein the matching engine enables a service provider of the new resource to advertise the new resource in terms of any of the attribute vocabularies registered in the repository.

4. The software system of claim 1, wherein the step of determining which of the attribute vocabularies registered in the repository match a set of desired attributes of a vocabulary comprises the step of generating a resource request to the matching engine wherein the resource request specifies the desired attributes of the vocabulary.

5. The software system of claim 4, wherein the matching engine performs an attribute-based lookup to the repository in response to the resource request from the service provider by comparing the desired attributes of the vocabulary to the attributes of each of the attribute vocabularies registered in the repository.

6. The software system of claim 1, wherein the step of obtaining the attribute properties comprises the step of obtaining the attribute properties from the vocabulary handler associated with the attribute vocabulary that matches the desired attributes.

7. The software system of claim 1, wherein the resource request from the potential client specifies a set of desired attributes of the new resource and a particular one of the attribute vocabularies with which to evaluate the desired attributes.

8. The software system of claim 7, wherein the matching engine in response to the resource request from the potential client matches the desired attributes of the new resource to the attributes of each available resource in the repository using the matching rules of the particular one of the attribute vocabularies.

9. The software system of claim 8, further comprising a vocabulary translator for translating the attributes of each available resource to the particular one of the attribute vocabularies.

10. The software system of claim 8, further comprising a vocabulary translator for translating the desired attributes of the new resource from the particular one of the attribute vocabularies to another one of the attribute vocabularies.

11. A method for advertising resources in a software system, comprising the steps of:

registering a set of attributes of each of a set of attribute vocabularies into a repository such that the registered attribute vocabularies appear as available resources in the software system;

performing an attribute-based lookup to the repository in response to a resource request from a potential client seeking to discover a new resource which is advertised in terms of a specified one of the attribute vocabularies wherein the attribute-based lookup is performed in accordance with a set of attribute properties and a set of matching rules which correspond to the specified one of the attribute vocabularies wherein the new resource is advertised by determining which of the attribute vocabularies registered in the repository match a set of desired attributes or a vocabulary, obtaining the attribute properties of the attribute vocabulary that matches the desired attributes, generating a set of attributes that describe the new resource in terms of the obtained attribute properties, and registering the attributes that describe the new resource into the repository.

12. The method of claim 11, wherein the step of registering a set of attributes comprises the steps of:

providing the matching engine with the attributes that describe the corresponding attribute vocabulary;

providing the matching engine with the matching rules for the corresponding attribute vocabulary.

13. The method of claim 11, further comprising the step of advertising the new resource in terms of any of the attribute vocabularies registered in the repository.

14. The method of claim 11, wherein the step of determining which of the attribute vocabularies registered in the repository match a set of desired attributes of a vocabulary comprises the step of generating a resource request to the matching engine wherein the resource request specifies the desired attributes of the vocabulary.

15. The method of claim 14, further comprising the step of performing an attribute-based lookup to the repository in response to the resource request from the service provider by comparing the desired attributes of the vocabulary to the attributes of each of the attribute vocabularies registered in the repository.

16. The method of claim 11, wherein the step of obtaining the attribute properties comprises the step of obtaining the attribute properties from he vocabulary handler associated with the attribute vocabulary that matches the desired attributes.

17. The method of claim 11, wherein the resource request from the potential client specifies a set of desired attributes of the new resource and the specified one of the attribute vocabularies with which to evaluate the desired attributes.

18. The method of claim 17, wherein the step of performing an attribute-based lookup comprises the step of matching the desired attributes off the new resource to the attributes of each available resource in the repository using the matching rules of the specified one of the attribute vocabularies.

19. The method of claim 18, further comprising the step of translating the attributes of each available resource to the specified one of the attribute vocabularies.

20. The method of claim 18, further comprising the step of translating the desired attributes of the new resource from the specified one of the attribute vocabularies to another one of the attribute vocabularies.

* * * * *